US007353391B2

(12) United States Patent
Sato et al.

(10) Patent No.: US 7,353,391 B2
(45) Date of Patent: Apr. 1, 2008

(54) AUTHENTICATING METHOD FOR SHORT-DISTANCE RADIO DEVICES AND A SHORT-DISTANCE RADIO DEVICE

(75) Inventors: Masahiko Sato, Tokyo (JP); Hidekazu Ikeda, Chiba (JP)

(73) Assignee: Sony Corporation, Tokyo (JP)

(*) Notice: Subject to any disclaimer, the term of this patent is extended or adjusted under 35 U.S.C. 154(b) by 695 days.

(21) Appl. No.: 09/920,376

(22) Filed: Aug. 2, 2001

(65) Prior Publication Data
US 2002/0016153 A1  Feb. 7, 2002

(30) Foreign Application Priority Data
Aug. 4, 2000 (JP) .......................... P2000-237245
Jun. 18, 2001 (JP) .......................... P2001-183616

(51) Int. Cl.
*H04L 9/32* (2006.01)
*G06F 7/04* (2006.01)
(52) U.S. Cl. .................. 713/169; 380/270; 726/3
(58) Field of Classification Search ................ 713/176, 713/169; 455/410, 411; 726/3; 380/270
See application file for complete search history.

(56) References Cited

U.S. PATENT DOCUMENTS

| 5,131,038 A | | 7/1992 | Puhl et al. |
| 5,463,659 A | * | 10/1995 | Nealon et al. ............... 375/133 |
| 5,592,533 A | * | 1/1997 | McHenry et al. ......... 455/435.2 |
| 5,875,394 A | * | 2/1999 | Daly et al. ................... 455/411 |
| 5,878,344 A | | 3/1999 | Zicker |
| 5,983,347 A | * | 11/1999 | Brinkmeyer et al. ....... 340/5.62 |
| 6,021,315 A | * | 2/2000 | Telewski ................. 455/67.11 |

(Continued)

FOREIGN PATENT DOCUMENTS

JP        2001-144767        5/2001

(Continued)

OTHER PUBLICATIONS

Executive Council. Fourteenth Session. Feb. 2-5, 1999. pp. 1,22.*

(Continued)

*Primary Examiner*—Emmanuel L. Moise
*Assistant Examiner*—Michael Pyzocha
(74) *Attorney, Agent, or Firm*—Finnegan, Henderson, Farabow, Garrett & Dunner, L.L.P.

(57) ABSTRACT

The invention provides a method for making mutual authentication between short-distance radio devices automatically or after confirmation by users, and a short-distance radio device for realizing the method. In a condition where a plurality of radio devices exist, each of the radio devices comprising a data communicating unit for performing short-distance radio communication and an authenticating unit for performing authentication of the radio device, the authenticating unit performs mutual authentication between two radio devices automatically or after confirmation by users of the radio devices when the two radio devices come closer to each other to such an extent that coverage areas of radio waves generated by the radio devices overlap with each other.

15 Claims, 8 Drawing Sheets

U.S. PATENT DOCUMENTS

| | | | |
|---|---|---|---|
| 6,088,450 A * | 7/2000 | Davis et al. | 713/182 |
| 6,148,205 A * | 11/2000 | Cotton | 455/435.1 |
| 6,282,183 B1 * | 8/2001 | Harris et al. | 370/338 |
| 6,288,639 B1 * | 9/2001 | Addy | 340/539.3 |
| 6,493,550 B1 * | 12/2002 | Raith | 455/422.1 |
| 6,680,923 B1 * | 1/2004 | Leon | 370/328 |
| 6,772,331 B1 * | 8/2004 | Hind et al. | 713/151 |
| 6,871,063 B1 * | 3/2005 | Schiffer | 455/410 |
| 7,114,010 B2 * | 9/2006 | Karaoguz et al. | 709/250 |

FOREIGN PATENT DOCUMENTS

| | | |
|---|---|---|
| JP | 2001-144781 | 5/2001 |
| WO | WO 02/062024 | 8/2002 |

OTHER PUBLICATIONS

Haartsen J: "Bluetooth—The Universal Radio Interface for Ad Hoc, Wireless Connectivity" On—Ericsson Review, Ericsson, Stockholm, SE, No. 3, 1998, pp. 110-117, XP000783249 ISSN: 0014 0171.

Specification of the Bluetooth System, Specification vol. 1, Wireless Connections Made Easy, Core v1.0 B, pp. 1, 47-66, 143-178, Chapters 4. "Packets" 13. "Bluetooth Addressing", 14. "Bluetooth Security" Bluetooth, Dec. 1, 1999, XP002211422.

Vainio Juha: "Bluetooth Security, Department of Computer Science and Engineering, Helsinki University of Technology" Helsinki University of Technology, May 25, 2000, XP002211441.

* cited by examiner

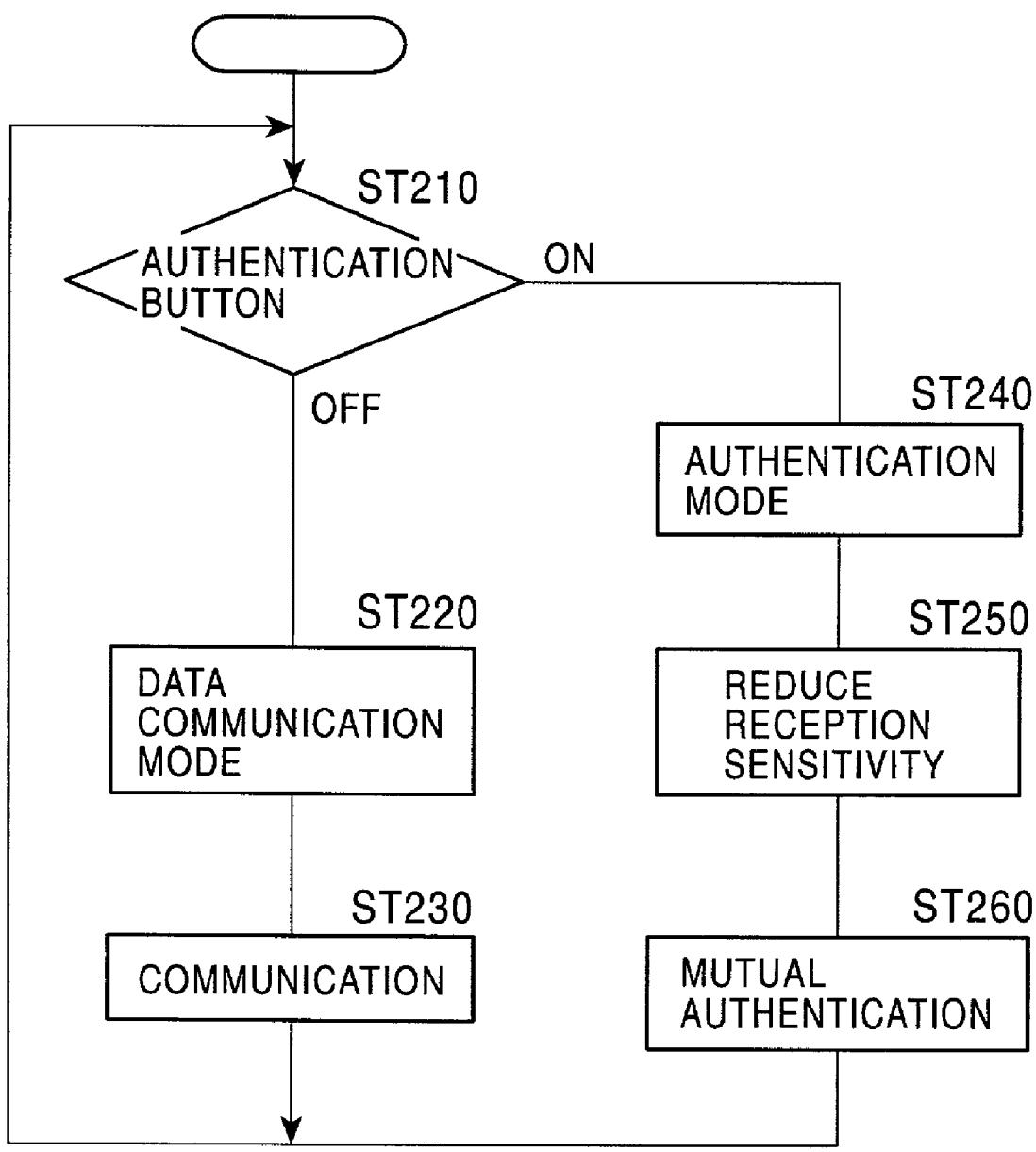

AUTHENTICATING METHOD FOR SHORT-DISTANCE RADIO DEVICES AND A SHORT-DISTANCE RADIO DEVICE

BACKGROUND OF THE INVENTION

1. Field of the Invention

The present invention relates to an authenticating method for short-distance radio devices and a short-distance radio device. More particularly, the present invention relates to an authenticating method for short-distance radio devices, which include data communicating units based on short-distance radio communication such as represented by Bluetooth, and which have the function enabling the radio devices to authenticate mutually with ease, as well as the short-distance radio device itself.

2. Description of the Related Art

In conventional general authentication procedures for portable radio (wireless) equipment, a system is made up of a base station and plural pieces of portable equipment, and an inquiry is issued to the base station from each piece of portable equipment for authentication thereof. The authentication is performed by inputting data, such as the ID number and the password, which have been set in advance, and checking for verification of the inputted data whether it is in match with data stored as a database or the like in the base station.

However, when data such as the ID number and the password is inputted for the authentication as described above, such data itself tends to be a longer string of symbols comprising characters and numerals in mixed fashion, and hence an operation for inputting the data has become troublesome. Also, mutual authentication procedures, which are general in radio communication, have a tendency to be used more and more in many applications in future. This causes another problem that the complicated authentication procedures make a user interface also complicated.

SUMMARY OF THE INVENTION

Accordingly, it is an object of the present invention to provide a method and a construction capable of easily performing mutual authentication between short-distance radio devices, in particular, portable devices.

To achieve the above object, an authenticating method for short-distance radio devices and a short-distance radio device according to the present invention are constituted as follows.

(1) An authenticating method for short-distance radio devices, comprising the steps of preparing a condition where a plurality of radio devices exist, each of the radio devices comprising a data communicating unit for performing short-distance radio communication and an authenticating unit for performing authentication of the radio device; and performing mutual authentication between two radio devices by the authenticating unit automatically or after confirmation by users of the radio devices when the two radio devices come closer to each other to such an extent that coverage areas of radio waves generated by the two radio devices overlap with each other.

(2) In the authenticating method for short-distance radio devices of (1), the step of performing the authentication by the authenticating unit is performed in a state where a transmission output of the radio device is reduced to shorten a communication distance of the radio device.

(3) In the authenticating method for short-distance radio devices of (2), the transmission output is reduced only in a particular one of the radio devices.

(4) In the authenticating method for short-distance radio devices of (2), the transmission output is reduced upon turning-on of an authentication button provided on the radio device.

(5) In the authenticating method for short-distance radio devices of (1), the step of performing the authentication by the authenticating unit is performed in a state where reception sensitivity of the radio device is reduced to shorten a communication distance of the radio device.

(6) In the authenticating method for short-distance radio devices of (5), the reception sensitivity is reduced only in a particular one of the radio devices.

(7) In the authenticating method for short-distance radio devices of (5), the reception sensitivity is reduced upon turning-on of an authentication button provided on the radio device.

(8) In the authenticating method for short-distance radio devices of (1), the radio device is a portable device.

(9) A short-distance radio device comprising a data communicating unit for performing short-distance radio communication and an authenticating unit for performing authentication of the radio device, the authenticating unit of the radio device performing, in a condition where a plurality of radio devices exist, mutual authentication between two radio devices automatically or after confirmation by users of the radio devices when the two radio devices come closer to each other to such an extent that coverage areas of radio waves generated by the radio devices overlap with each other.

(10) In the short-distance radio device of (9), the authenticating unit performs the authentication in a state where a transmission output of the radio device is reduced to shorten a communication distance of the radio device.

(11) In the short-distance radio device of (10), the transmission output is reduced only in a particular one of the radio devices.

(12) In the short-distance radio device of (10), the transmission output is reduced upon turning-on of an authentication button provided on the radio device.

(13) In the short-distance radio device of (9), the authenticating unit performs the authentication in a state where reception sensitivity of the radio device is reduced to shorten a communication distance of the radio device.

(14) In the short-distance radio device of (13), the reception sensitivity is reduced only in a particular one of the radio devices.

(15) In the short-distance radio device of (13), the reception sensitivity is reduced upon turning-on of an authentication button provided on the radio device.

(16) In the short-distance radio device of (9), the radio device is a portable device.

Thus, in a condition where a plurality of short-distance radio devices exist, particularly portable radio devices, each of the radio devices comprising a data communicating unit for performing short-distance radio communication and an authenticating unit for performing authentication of the radio device, the authenticating unit performs mutual authentication between two radio devices automatically or after confirmation by users when coverage areas of radio waves generated by the radio devices overlap with each other, that is, when the two radio devices come close to each other within a predetermined distance. As a result, an operation for inputting complex data, such as the authentication number, is eliminated and the operability can be greatly improved.

BRIEF DESCRIPTION OF THE DRAWINGS

FIG. 7 is a flowchart showing the operation of the terminal device of FIG. 6;

DESCRIPTION OF THE PREFERRED EMBODIMENTS

Embodiments of an authenticating method for short-distance radio devices and a short-distance radio device according to the present invention will be described below with reference to the drawings.

Figure 1:
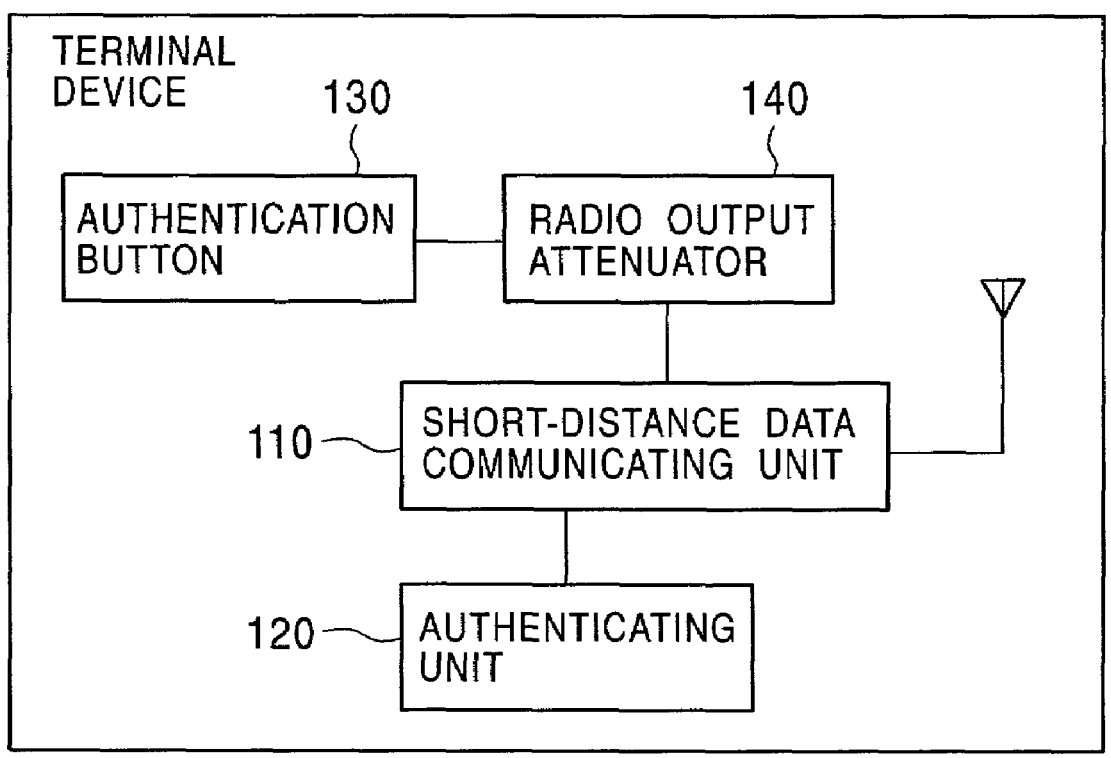
FIG. 1 is a block diagram showing the configuration of a terminal device as a short-distance radio device according to a first embodiment of the present invention.

According to a first embodiment of the present invention, as shown in FIG. 1, the short-distance radio device for realizing the authenticating method for short-distance radio devices is constituted by a portable terminal device such as a cellular phone. The terminal device comprises a short-distance data communicating unit 110 which forms a data communicating means for performing short-distance radio communication; an authenticating unit 120 which serves as an authenticating means capable of decoding, for analysis to make authentication, data received by the short-distance data communicating unit 110 in the authentication mode; an authentication button 130 for establishing the authentication mode; and a radio output attenuating unit 140 for attenuating a radio output and narrowing the coverage area of radio waves, when the authentication button 130 is depressed to turn on.

Figure 2:
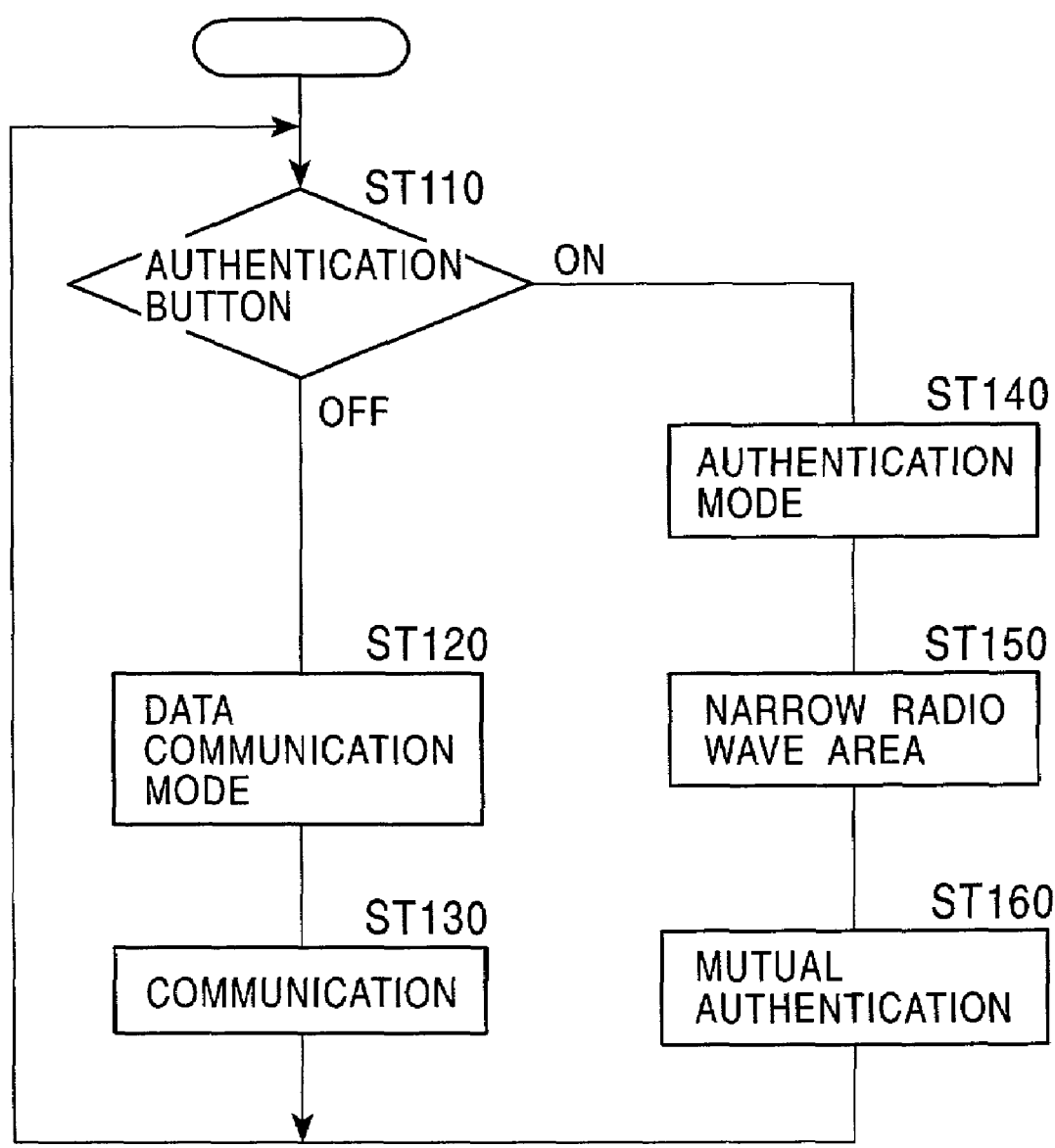
FIG. 2 is a flowchart showing the operation of the terminal device.

The operation of the terminal device thus constructed will be described below in connection with a flowchart shown in FIG. 2 while referring to FIG. 1.

Figure 3:
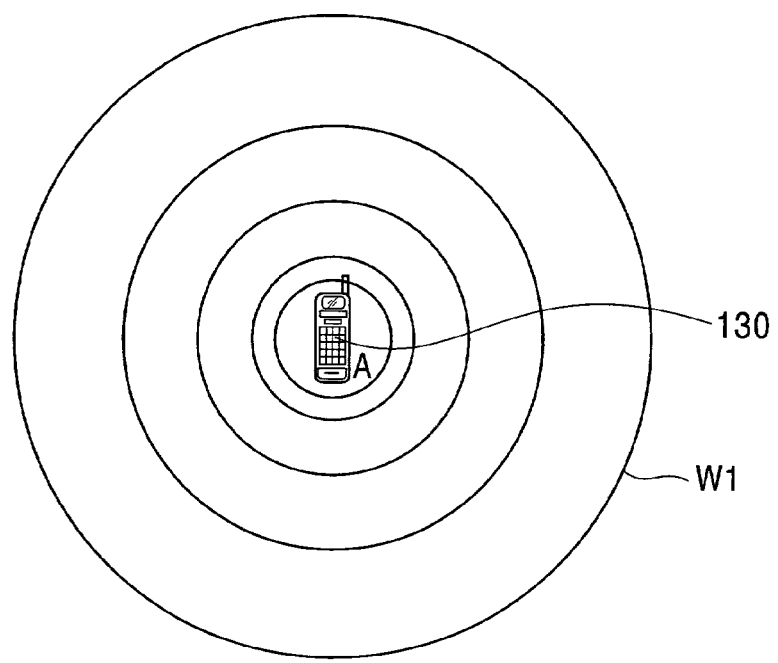
FIG. 3 is an explanatory view showing the coverage area of radio waves when the terminal device is operated in the data communicating mode.

When the authentication button 130 is turned off, the terminal device is in the data communication mode in which ordinary communication is carried out (steps ST110, ST120 and ST130). More specifically, as shown in FIG. 3, a terminal device A is in the ordinary operating state and produces a transmission output capable of covering a certain large distance (area indicated by W1 in FIG. 3).

Figure 4:
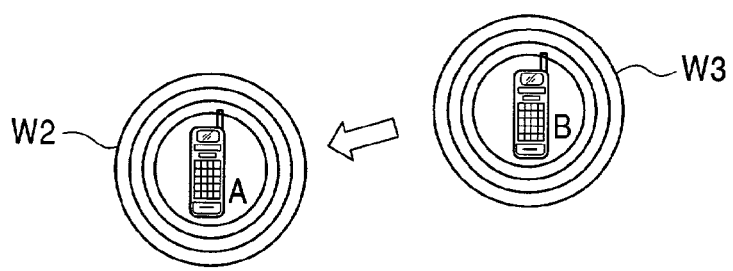
FIG. 4 is an explanatory view showing the coverage area of radio waves when the terminal device is operated in the authentication mode.

When the authentication button 130 is depressed to turn on, the terminal device is brought into the authentication mode in which the transmission output is reduced and the coverage area of transmitted radio waves is considerably narrowed (steps ST110, ST140 and ST150). For example, the transmission output is reduced to such an extent that two terminal devices are not able to receive or transmit data unless they are positioned close to each other. Then, when the coverage areas of radio waves transmitted from the terminal devices come into an overlapped relation, i.e., when the terminal devices are positioned close to each other, mutual authentication is enabled to start (step ST160). More specifically, as shown in FIG. 4, by depressing the authentication button 130 of the terminal device A to turn on, the terminal device A is brought into the authentication mode. In this operating mode, the transmission output is considerably reduced and the communication distance (area indicated by W2 in FIG. 4) is set to such a range that two terminal device are not able to communicate data unless they approach very close to each other. Simultaneously, the other terminal device B, also in which the authentication button 130 is depressed and the communication distance is narrowed as indicated by W3, comes closer to the terminal device A for mutual authentication.

Figure 5:
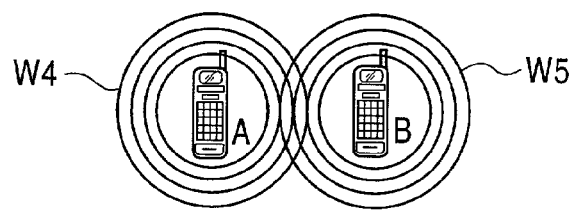
FIG. 5 is an explanatory view showing mutual authentication between the terminal devices operated in the authentication mode.

Then, as shown in FIG. 5, when both the terminal devices A and B come close to each other and enter within a distance capable of communicating data therebetween (as indicated by communication distances W4 and W5), the mutual authentication is performed between the terminal devices automatically or after confirmation by users.

While this embodiment is arranged to perform the mutual authentication in the state where the transmission outputs of both the terminal devices A and B are reduced, the present invention is not limited to such an arrangement. As a matter of course, the transmission output of only one particular terminal device may be reduced.

Thus, since the coverage area of radio waves outputted in the authentication mode is narrowed to such an extent that two terminal devices are able to receive data only when they are positioned close to each other, it is possible to prevent the mutual authentication from being performed among a number of terminal devices, and to carry out the mutual authentication essentially in a one-to-one relation.

Next, a second embodiment of an authenticating method for short-distance radio devices and a short-distance radio device according to the present invention will be described below with reference to the drawings.

Figure 6:
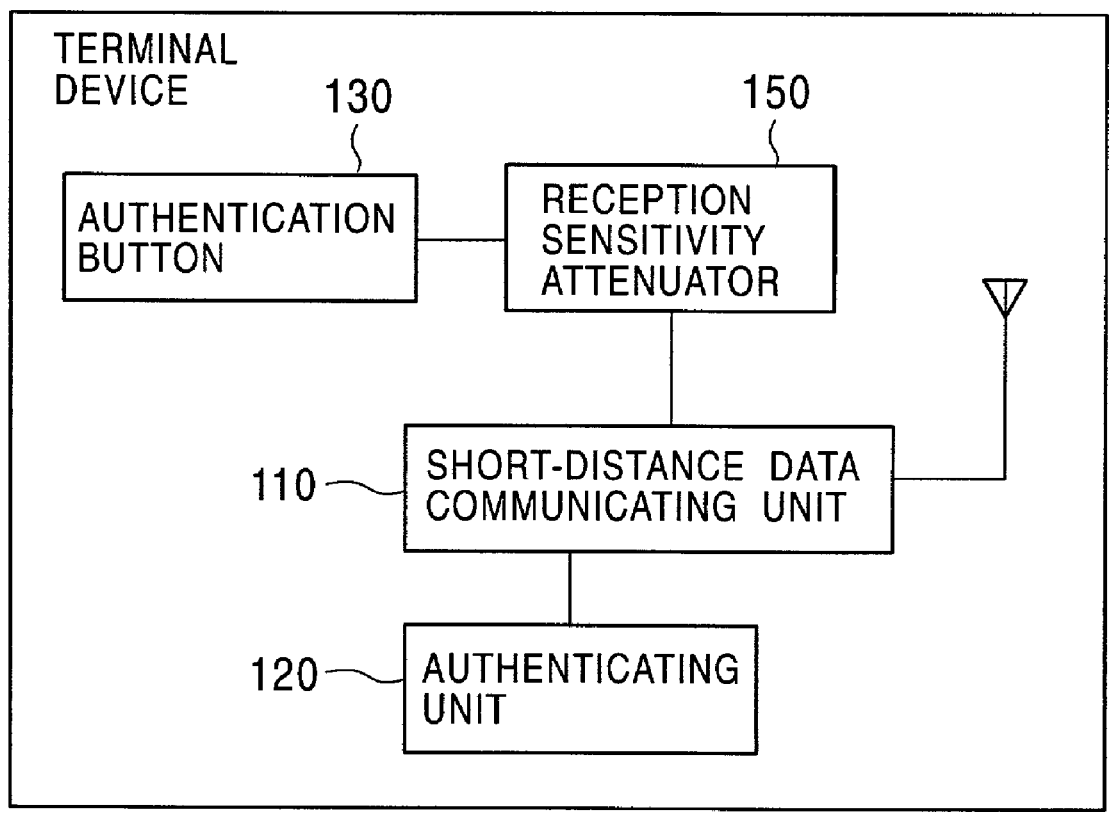
FIG. 6 is a block diagram showing the configuration of a terminal device as a short-distance radio device according to a second embodiment of the present invention.

According to the second embodiment of the present invention, as shown in FIG. 6, the short-distance radio device for realizing the authenticating method for short-distance radio devices is constituted by a portable terminal device, such as a cellular phone, similarly to the first embodiment described above. The terminal device comprises a short-distance data communicating unit 110 which forms a data communicating means for performing short-distance radio communication; an authenticating unit 120 which serves as an authenticating means capable of decoding, for analysis to make authentication, data received by the short-distance data communicating unit 110 in the authentication mode; an authentication button 130 for establishing the authentication mode; and a reception sensitivity attenuating unit 150 for reducing reception sensitivity and shortening the communication distance, when the authentication button 130 is depressed to turn on.

The operation of the terminal device thus constructed will be described below in connection with a flowchart shown in FIG. 7 while referring to FIG. 6.

Figure 8A:
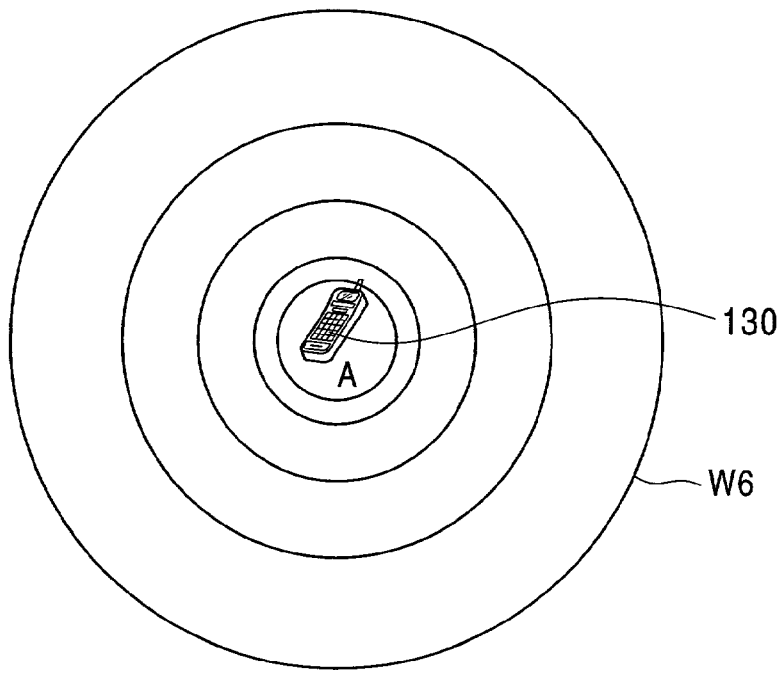
FIGS. 8A, 8B and 8C are explanatory views showing an authentication state between the terminal devices of FIG. 6 operated in the authentication mode with reduced reception sensitivity.

When the authentication button 130 is turned off, the terminal device is in the data communication mode in which ordinary communication is carried out (steps ST210, ST220 and ST230). More specifically, as shown in FIG. 8A, a terminal device A is in the ordinary operating state and produces a transmission output capable of covering a certain large distance (area indicated by W6 in FIG. 8A).

Figure 8B:
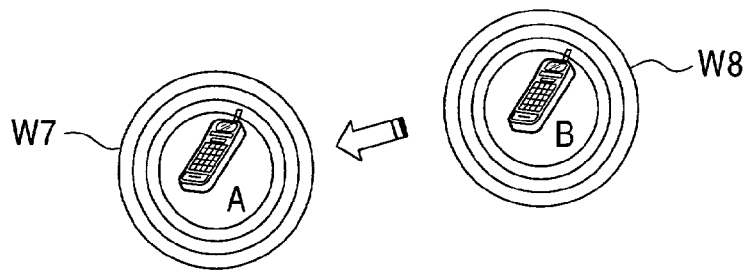

When the authentication button 130 is depressed to turn on, the terminal device is brought into the authentication mode in which the reception sensitivity is reduced and the communication distance is considerably shortened (steps ST210, ST240 and ST250). For example, the reception sensitivity is reduced to such an extent that two terminal devices are not able to receive or transmit data unless they are positioned close to each other. Then, when the coverage areas of radio waves transmitted from the terminal devices are overlapped with each other and the terminal devices come into within a distance capable of communicating data between them, i.e., when the terminal devices are positioned close to each other, mutual authentication is enabled to start (step ST260). More specifically, as shown in FIG. 8B, by depressing the authentication button 130 of the terminal device A to turn on, the terminal device A is brought into the authentication mode. In this operating mode, the reception sensitivity is considerably reduced and the communication distance (area indicated by W7 in FIG. 8B) is set to such a range that two terminal device are not able to communicate data unless they approach very close to each other. Simultaneously, the other terminal device B, also in which the authentication button 130 is depressed and the communication distance is narrowed as indicated by W8, comes closer to the terminal device A for mutual authentication.

Figure 8C:
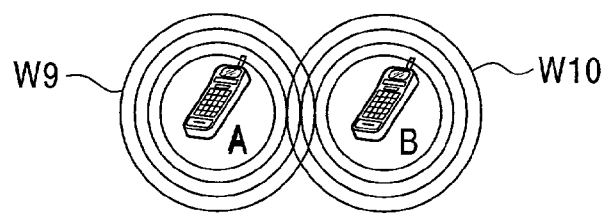

Then, as shown in FIG. 8c, when both the terminal devices A and B come close to each other and enter within a distance capable of communicating data therebetween (as indicated by communication distances W9 and W10), the mutual authentication is performed between the terminal devices automatically or after confirmation by users.

While this embodiment is arranged to perform the mutual authentication in the state where the reception sensitivity of each of the terminal devices A and B is reduced, the present invention is not limited to such an arrangement. As a matter of course, the reception sensitivity of only one particular terminal device may be reduced.

Figure 9:
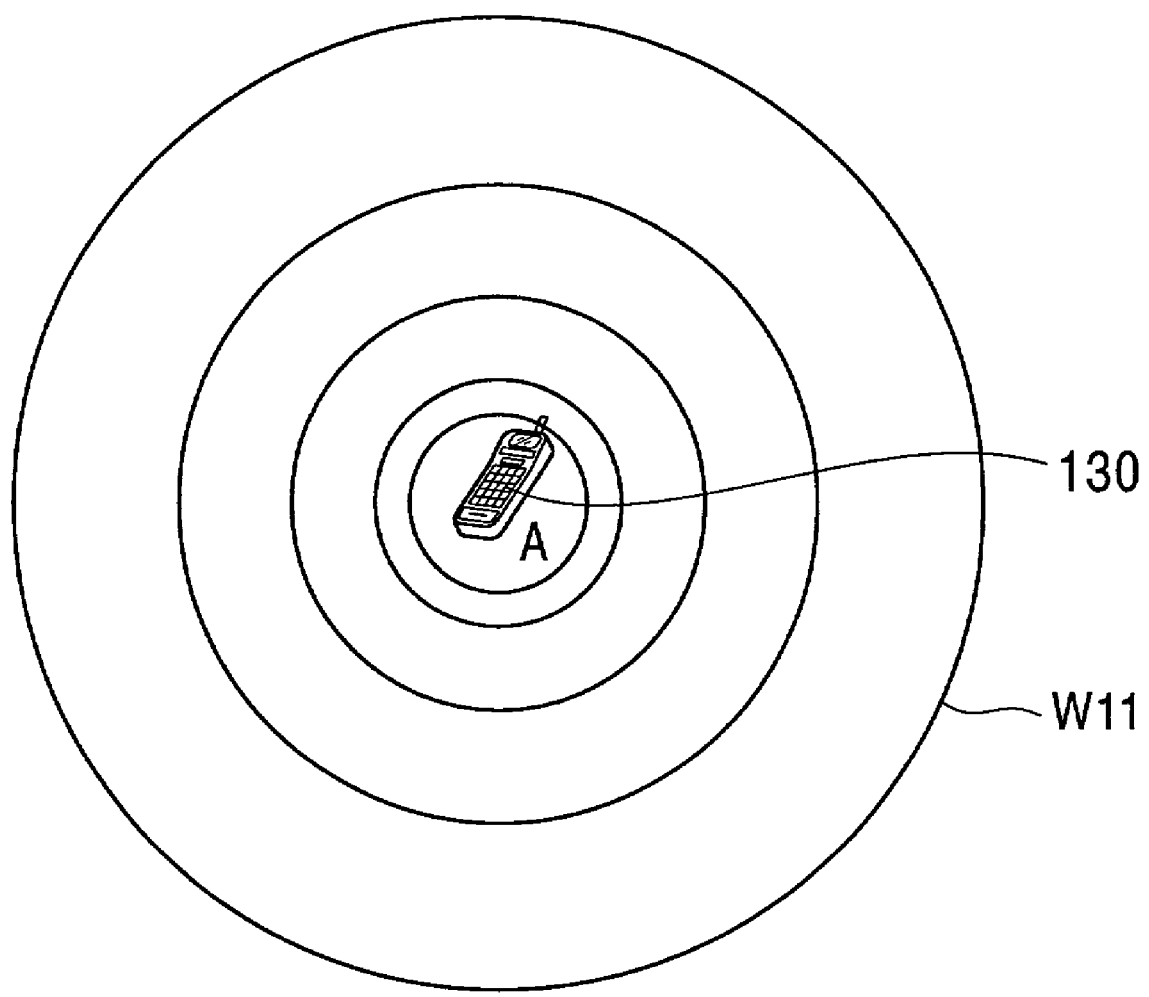
FIG. 9 is an explanatory view showing the coverage area of radio waves when the terminal device of FIG. 6 is operated in the data communicating mode.
Figure 10:
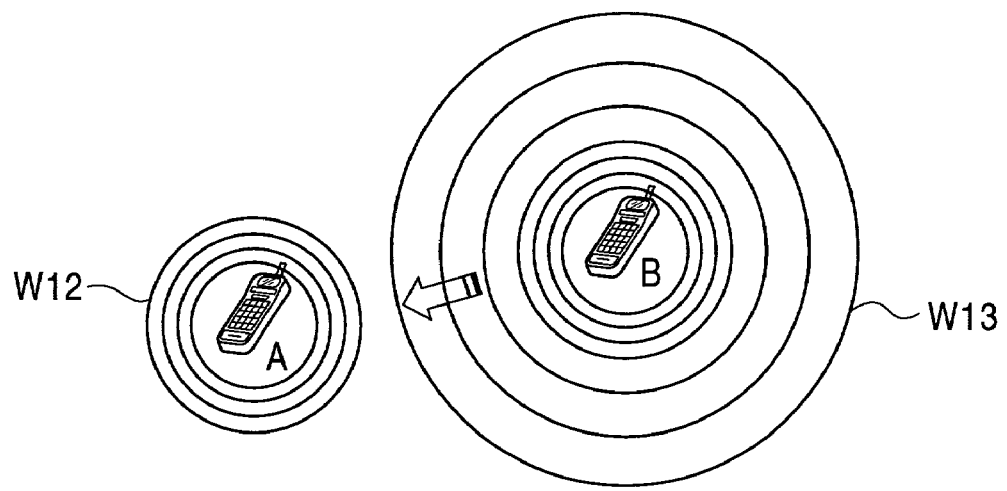
FIG. 10 is an explanatory view showing an authentication state between the terminal devices of FIG. 6 when a particular terminal device is operated in the authentication mode with reduced reception sensitivity.
Figure 11:
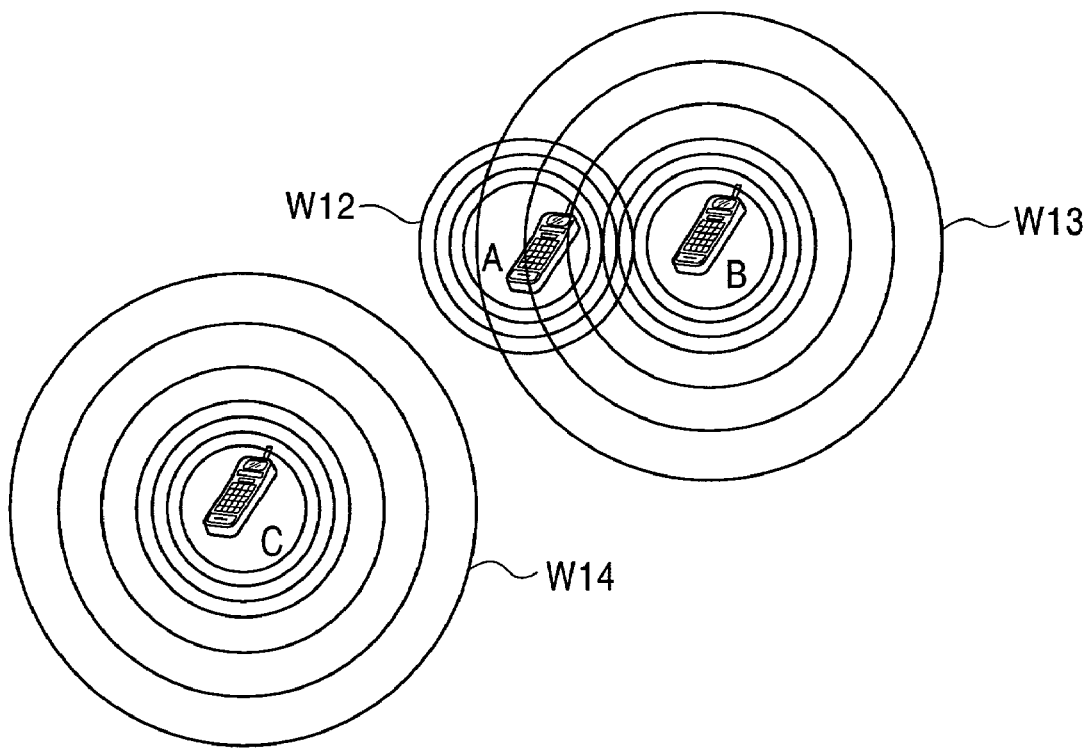
FIG. 11 is an explanatory view showing mutual authentication between the terminal devices of FIG. 6 operated in the authentication mode.

FIGS. 9 to 11 show mutual authentication between the terminal devices of FIG. 6 when a particular terminal device (A in this embodiment) is operated with reduced reception sensitivity. First, as shown in FIG. 9, the terminal device A is in the ordinary operating state and produces a transmission output capable of covering a certain large distance (area indicated by W11 in FIG. 9).

In the above condition, when the authentication button 130 of the terminal device A is depressed to turn on, the terminal device A is brought into the authentication mode as shown in FIG. 10. In this operating mode, the reception sensitivity is considerably reduced and the communication distance (coverage area indicated by W12 in FIG. 10) is reduced to such a range that two terminal device are not able to communicate data unless they approach very close to each other.

Subsequently, the other terminal device B having the ordinary communication distance (coverage area W13 in FIG. 10) comes closer to the terminal device A. Then, as shown in FIG. 11, when the terminal device B having the communication distance W13 comes closer to the terminal device A having the reduced communication distance (narrowed coverage area) W12 to such an extent that both the terminal devices enter within a distance capable of communicating data therebetween, the mutual authentication is performed between the terminal devices automatically or after confirmation by users.

Additionally, when the terminal devices A and B are positioned close to each other, a coverage area W14 of another terminal device C is outside the coverage areas of the terminal devices A and B. The mutual authentication between the terminal devices A and C is therefore not performed.

Thus, since the coverage area of radio waves outputted in the authentication mode is narrowed to such an extent that two terminal devices are able to receive data only when they are positioned close to each other, it is possible to prevent the mutual authentication from being performed among a number of terminal devices, and to carry out the mutual authentication essentially in a one-to-one relation.

The mutual authentication is performed by reducing the transmission output in the first embodiment and by reducing the reception sensitivity in the second embodiment. As a matter of course, however, the mutual authentication may be performed between terminal devices which are each equipped with both the functions.

With the authenticating method for short-distance radio devices and the short-distance radio device according to the present invention, as described hereinabove, the mutual authentication is performed between two terminal devices automatically or after confirmation by users when the terminal devices are brought into the authentication mode and are positioned close to each other. As a result, an operation for inputting data for authentication is no longer required, and hence the operability is improved. Further, the mutual authentication can be performed with no need of special highly-equipped user interfaces.

What is claimed is:

1. An authenticating method for portable radio devices, comprising data communicating means for performing radio communication over a first coverage area and authenticating means for performing authentication of said portable radio devices over a second coverage area, comprising the steps of:

switching coverage area of two or more of said portable radio devices, prior to initiating authentication between the portable radio devices, from the first coverage area to the second coverage area, the second coverage area being smaller than the first coverage area;

bringing, prior to initiating authentication between the portable radio devices, the two or more portable radio devices having the second coverage area to within a proximity of one another so that the coverage areas of the two or more portable radio devices overlap;

initiating mutual authentication by establishing communication between the two or more portable radio devices based only on the bringing of the two or more portable radio devices to within the proximity; and performing mutual authentication between the two or more portable radio devices by said authenticating means automatically when the coverage area of the two or more portable radio devices overlap.

2. The authenticating method for the portable radio devices according to claim 1, wherein the step of performing the authentication by said authenticating means is performed in a state where a transmission output of said portable radio devices is reduced to shorten a communication distance of said portable radio devices.

3. The authenticating method for the portable radio devices according to claim 2, wherein the transmission output is reduced upon turning-on an authentication button provided on said particular one of said portable radio devices.

4. The authenticating method for the portable radio devices according to claim 1, wherein the step of performing the authentication by said authenticating means is performed in a state where reception sensitivity of said portable radio devices is reduced to shorten a communication distance of said portable radio devices.

5. The authenticating method for the portable radio devices according to claim 4, wherein the reception sensitivity is reduced upon turning-on an authentication button provided on said particular one of said portable radio devices.

6. An authenticating method for portable radio devices, comprising data communicating means for performing radio communication over a first coverage area and authenticating means for performing authentication of said portable radio devices over a second coverage area, comprising the steps of:

switching coverage area of a portable radio device, prior to initiating authentication between the portable radio devices, from the first coverage area to the second coverage area, the second coverage area being smaller than the first coverage area;

bringing, prior to initiating authentication between the portable radio devices, the two or more portable radio devices having the second coverage area to within a proximity of one another so that the coverage areas of the two or more portable radio devices overlap; and performing mutual authentication between two or more portable radio devices by said authenticating means automatically when the coverage area of the two or more portable radio devices overlap, wherein a transmission output of only a particular one of said portable radio devices is reduced to shorten a communication distance of said portable radio devices.

7. An authenticating method for portable radio devices, comprising data communicating means for performing radio communication over a first coverage area and authentication means for performing authentication of said portable radio devices over a second coverage area, comprising the steps of:

switching coverage area of a portable radio device, prior to initiating authentication between the portable radio devices, from the first coverage area to the second coverage area, the second coverage area being smaller than the first coverage area;

bringing, prior to initiating authentication between the portable radio devices, the two or more portable radio devices having the second coverage area to within a proximity of one another so that the coverage areas of the two or more portable radio devices overlap; and performing mutual authentication between the two or more portable radio devices by said authenticating means automatically when the coverage area of the two or more portable radio devices overlap, wherein a reception sensitivity of only a particular one of said portable radio devices is reduced to shorten a communication distance of said portable radio devices.

8. A portable radio device comprising:

data communicating means for performing radio communication over a first coverage areas;

authenticating means for performing authentication over a second coverage area of said portable radio device; and switching means for switching the coverage area of said portable radio device, prior to initiating authentication between the portable radio devices, from said first coverage area to said second coverage area, said second coverage area being smaller than said first coverage area;

wherein said authenticating means of said portable radio device initiates mutual authentication between two or more portable radio devices based only on the bringing of the two or more portable radio devices to within a proximity such that the coverage areas of the two or more portable radio devices overlap; and wherein said authenticating means of said portable radio device performs mutual authentication between the two or more portable radio devices automatically when the two or more portable radio devices are brought in proximity to one another so that the second coverage areas overlap.

9. The portable radio device according to claim 8, wherein said authenticating means performs the authentication in a state where a transmission output of said plurality of portable radio devices is reduced to shorten a communication distance of said portable radio devices.

10. The portable radio device according to claim 9, wherein the transmission output is reduced upon turning-on an authentication button provided on said particular one of said portable radio devices.

11. The portable radio device according to claim 8, wherein said authenticating means performs the authentication in a state where reception sensitivity of said portable radio devices is reduced to shorten a communication distance of said portable radio devices.

12. The portable radio device according to claim 11, wherein the reception sensitivity is reduced upon turning-on an authentication button provided on said particular one of said portable radio devices.

13. A portable radio device comprising:

data communicating means for performing radio communication over a first coverage area;

authenticating means for performing authentication over a second coverage area of said portable radio device; and switching means for switching the coverage area of said portable radio device, prior to initiating authentication between the portable radio devices, from said first coverage area to said second coverage area, said second coverage area being smaller than said first coverage area;

wherein said authenticating means of said portable radio device performs, in a condition where a plurality of portable radio devices exist, mutual authentication between two or more portable radio devices automatically when the two or more portable radio devices are brought in proximity to one another so that the second coverage areas overlap, and wherein a transmission output of only a particular one of said portable radio devices is reduced to shorten communication distance of said portable radio devices.

14. A portable radio device comprising:

data communicating means for performing radio communication over a first coverage area;

authenticating means for performing authentication over a second coverage area of said portable radio device; and switching means for switching the coverage area of said portable radio device, prior to initiating authentication between the portable radio devices, from said first coverage area to said second coverage area, said second coverage area being smaller than said first coverage area;

wherein said authenticating means performs, in a condition where a plurality of portable radio devices exist, mutual authentication between two or more portable radio devices automatically when the two or more portable radio devices are brought in proximity to one another so that the second coverage areas overlap, and wherein a reception sensitivity of only a particular one of said portable radio devices is reduced to shorten communication distance of said portable radio devices.

15. An authenticating method for mobile radio devices, comprising the steps of:

providing a plurality of mobile radio devices, each of said plurality of mobile radio devices comprising data communicating means for performing radio communication and authenticating means for performing authentication of said mobile radio devices; reducing, prior to initiating authentication, the coverage areas of the mobile radio devices;

initiating mutual authentication by establishing communication between two or more radio devices based only on the bringing of the two or more radio devices to within a proximity such that the coverage areas of radio waves generated by the two or more mobile radio devices overlap; and performing mutual authentication between two or more mobile radio devices by said authenticating means automatically when the two or more mobile radio devices come sufficiently closer to each other that coverage areas of radio waves generated by the two or more mobile radio devices overlap.

* * * * *

UNITED STATES PATENT AND TRADEMARK OFFICE
CERTIFICATE OF CORRECTION

| | |
|---|---|
| PATENT NO. | : 7,353,391 B2 |
| APPLICATION NO. | : 09/920376 |
| DATED | : April 1, 2008 |
| INVENTOR(S) | : Masahiko Sato and Hidekazu Ikeda |

It is certified that error appears in the above-identified patent and that said Letters Patent is hereby corrected as shown below:

Claim 8, col. 8, line 6 - "areas" should read --area--

Claim 15, col. 10, line 5 - start new paragraph before "reducing."

Signed and Sealed this

Nineteenth Day of May, 2009

JOHN DOLL
*Acting Director of the United States Patent and Trademark Office*